(12) United States Patent
Cuddihy et al.

(10) Patent No.: US 9,621,811 B2
(45) Date of Patent: Apr. 11, 2017

(54) NON-FUNCTIONING HEADLIGHT WARNING

(71) Applicant: Ford Global Technologies, LLC, Dearborn, MI (US)

(72) Inventors: Mark A. Cuddihy, New Boston, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 64 days.

(21) Appl. No.: 14/722,311

(22) Filed: May 27, 2015

(65) Prior Publication Data

US 2016/0350939 A1 Dec. 1, 2016

(51) Int. Cl.
*G06K 9/00* (2006.01)
*H04N 5/232* (2006.01)
*G06T 7/11* (2017.01)
*G06T 7/90* (2017.01)

(52) U.S. Cl.
CPC ........... *H04N 5/23293* (2013.01); *G06T 7/11* (2017.01); *G06T 7/90* (2017.01); *G06T 2207/10004* (2013.01); *G06T 2207/30252* (2013.01)

(58) Field of Classification Search
CPC ..... G06T 7/40; G06T 7/00; G06T 2201/0051; G06T 2201/0052; G06T 1/0028; H04N 5/232; H04N 2201/3233; H04N 2201/327
USPC ........................................................ 382/100
See application file for complete search history.

(56) References Cited

U.S. PATENT DOCUMENTS

| 2009/0066819 | A1* | 3/2009 | Ando ...................... G06T 5/009 348/254 |
| 2011/0069303 | A1 | 3/2011 | Mehr |
| 2012/0001547 | A1* | 1/2012 | Nishitani ................. B60Q 1/50 315/82 |
| 2012/0127311 | A1 | 5/2012 | Ruth |
| 2014/0015962 | A1* | 1/2014 | Wilds ................... G01M 11/065 348/135 |
| 2014/0049639 | A1 | 2/2014 | Brosinger |

FOREIGN PATENT DOCUMENTS

| DE | 102008037266 A1 | 2/2010 |
| FR | 2936194 B1 | 9/2008 |
| JP | H0875607 A | 3/1996 |
| JP | 201037757 A | 6/2010 |

OTHER PUBLICATIONS

Daniel Stern Lighting, "Inspection & approval protocol for vehicle lamps, lights, and reflectors", Jun. 2009, Retrieved from Internet on Sep. 23, 2016, retrieved from httpl:<http://cvse.ca/vehicle_inspections/PDF/2009_Vehicle_Lightning_Protocol.pdf>.*

\* cited by examiner

*Primary Examiner* — Gregory F Cunningham
(74) *Attorney, Agent, or Firm* — Frank A. MacKenzie; Bejin Bieneman PLC

(57) ABSTRACT

A vehicle system includes a processing device programmed to identify a first zone and a second zone in an image of an area ahead of a vehicle. The processing device compares a first brightness associated with the first zone to a second brightness associated with the second zone to determine a brightness difference. The processing device can determine whether at least one vehicle headlight has malfunctioned based at least in part on the brightness difference.

20 Claims, 3 Drawing Sheets

NON-FUNCTIONING HEADLIGHT WARNING

BACKGROUND

Vehicle headlights serve various purposes. They help a driver see the road and lane markers during low ambient light conditions. Headlights can also help other drivers see that an oncoming vehicle is approaching. The headlights are often controlled with a switch located in the passenger compartment. Some vehicle headlights turn on automatically based on the amount of ambient light around the vehicle.

DETAILED DESCRIPTION

Headlight assemblies often include one or more bulbs that illuminate an area ahead of the vehicle. The bulbs may burn out after many hours of use. Burned out bulbs should be replaced to provide the driver with all the benefits of having vehicle headlights. It is not always easy for a driver to notice when a bulb has burnt out, however. Using a camera or other vision sensor, the vehicle can notify the driver that a headlight has malfunctioned.

For instance, an example vehicle system that notifies a driver when a headlight has malfunctioned includes a processing device programmed to identify a first zone and a second zone in an image of an area ahead of a vehicle. The image may be captured by the vision sensor. The processing device then compares a first brightness associated with the first zone to a second brightness associated with the second zone to determine a brightness difference. Since two fully functioning headlights will output approximately the same amount of light, the difference between the first brightness and the second brightness should be relatively minimal if both headlights are working properly. Thus, the processing device can compare the brightness difference to a predetermined threshold and determine whether at least one vehicle headlight has malfunctioned based at least in part on the magnitude of the brightness difference. If one of the headlights has malfunctioned, the processing device may notify the driver. The driver can confirm the headlight malfunction via visual inspection of the headlights.

The elements shown may take many different forms and include multiple and/or alternate components and facilities. The example components illustrated are not intended to be limiting. Indeed, additional or alternative components and/or implementations may be used.

Figure 1:
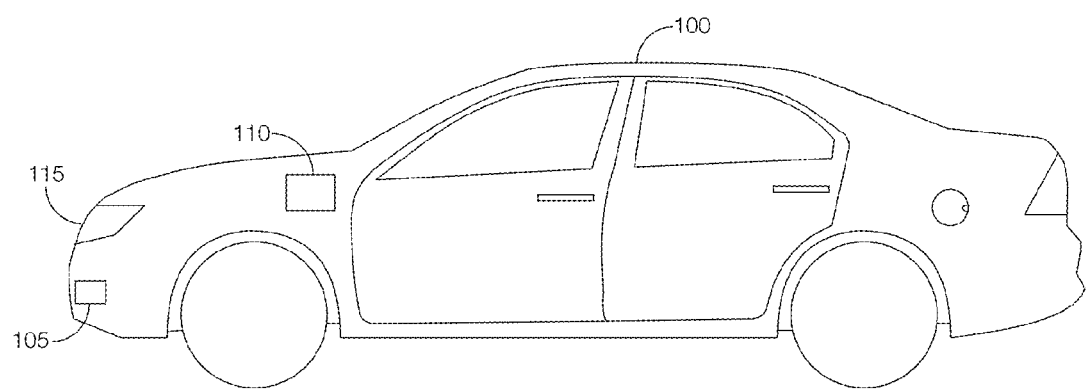
FIG. 1 illustrates an example vehicle with a system for detecting a headlight malfunction.

As illustrated in FIG. 1, the host vehicle 100 includes a vision sensor 105 and a headlight assessment system 110. The vision sensor 105 may include any electronic device, such as a camera packaged at any convenient location on the vehicle 100, and programmed to capture an image of an area ahead of the host vehicle 100. The image may include an area that would be illuminated by properly working headlights 115. The vision sensor 105 may be programmed to output an image signal representing the captured image. The headlight assessment system 110 may receive the image signal and process the image to determine whether one of the headlights 115 has malfunctioned. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

Figure 2:
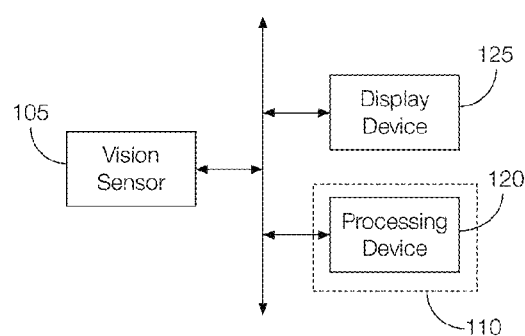
FIG. 2 is a block diagram showing example components of the system of FIG. 1.

Referring now to FIG. 2, the headlight assessment system 110 may include a processing device 120. Further, the headlight assessment system 110 may include or operate in cooperation with the vision sensor 105, a display device 125, or both.

An example display device 125 may include an electronic device located in the passenger compartment of the host vehicle 100. The display device 125 may be programmed to present information to a user, such as a driver, during operation of the host vehicle 100. Examples of such information may include, e.g., the image captured by the vision sensor 105. The image may be processed, however, without displaying the image to the driver since the image may be similar to the view that the driver has outside the windshield. Nevertheless, the image may be displayed with overlays (see FIG. 3) so that the driver can independently assess whether one of the headlights 115 has failed from inside the passenger compartment. Moreover, the display device 125 may be programmed to receive user inputs. Thus, in some possible approaches, the user interface device may include, e.g., a touch-sensitive display screen.

Figure 3:
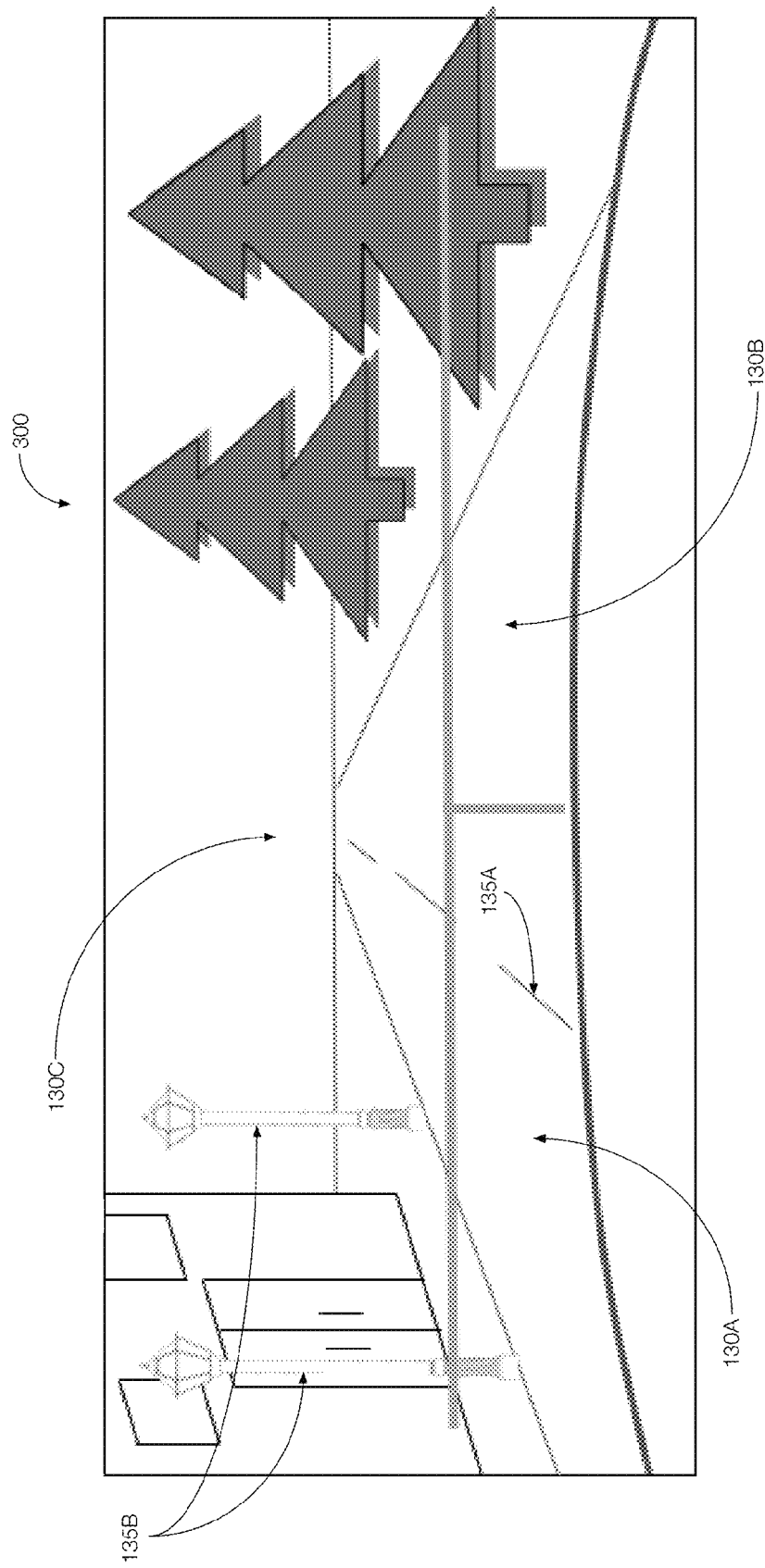
FIG. 3 is an example image with multiple zones that may be processed to determine whether a headlight has malfunctioned.

The processing device 120 may include any electronic device programmed to process the image and determine, by processing the image, whether one of the headlights 115 has malfunctioned. To process the image, the processing device 120 may be programmed to identify multiple zones in the image of the area ahead of the host vehicle 100. Examples of zones are shown in FIG. 3. One zone may represent an area that would be primarily illuminated by a left headlight ("the left zone" 130A), another zone may represent an area that would be primarily illuminated by a right headlight ("the right zone" 130B), and yet another zone may represent an area that would not be illuminated by either headlight ("the other zone" 130C).

With the zones identified, the processing device 120 may be programmed to determine the brightness of the two zones that should be illuminated primarily by one of the headlights 115. For instance, the processing device 120 may be programmed to determine a first brightness associated with the pixels in the left zone of the image and a second brightness associated with the pixels in the right zone. Each pixel may be associated with a brightness value, and the first brightness may include the sum of all brightness values of the pixels in the left zone Likewise, the second brightness may include the sum of all brightness values of the pixels in the right zone.

The processing device 120 may compare the first brightness to the second brightness to determine a brightness difference and compare the brightness difference to a predetermined threshold. In some instances, the processing device 120 may determine an average pixel brightness. That is, the processing device 120 may be programmed to divide the first brightness by the number of pixels in the first zone and divide the second brightness by the number of pixels in the second zone. Therefore, instead of comparing the sums of the brightness values in the respective zones, the processing device 120 may be programmed to compare the average pixel brightness of the left zone to the average pixel brightness of the right zone. For example, the processing device 120 may define the brightness difference as the difference in average pixel brightness between the left and right zones.

The processing device 120 may be programmed to compare the brightness difference to the predetermined threshold in accordance with Equation 1.

$$\left| \frac{\sum_{k=0}^{n} \sum_{j=0}^{i} \beta_{j_{Ak}}}{n} - \frac{\sum_{k=0}^{n} \sum_{j=0}^{i} \beta_{j_{Bk}}}{n} \right| > \beta_{Thresh} \quad (1)$$

In Equation (1), $\beta_j$ represents the brightness of an individual pixel in the zone. The value i represents the total number of pixels in the zone, and the sum of the pixel brightness is averaged over n number of images. The value A may designate the left zone while the value B may designate the right zone. The absolute value of the brightness difference may be compared to the predetermined threshold, shown as $\beta_{Thresh}$ in Equation (1).

If the brightness difference exceeds the predetermined threshold, the processing device 120 may output a signal indicating that one of the headlights 115 has malfunctioned. In some instances, the signal output by the processing device 120 may further identify which headlight has malfunctioned. For instance, if the pixels in the left zone are significantly darker than the pixels in the right zone, the signal may indicate that the left headlight has malfunctioned. If, however, the pixels in the right zone are significantly darker than the pixels in the left zone, the signal may indicate that the right headlight has malfunctioned. The processing device 120 may output the signal to the display device 125 or instrument panel so that an appropriate warning or indicator may be illuminated to alert the driver of the malfunctioning headlight. In some instances, the system 110 may also provide audible messages to the driver using vehicle based connectivity systems such as the Ford Sync® operating system.

Sometimes, objects, referred to as interfering objects (see FIG. 3), may contribute or reflect enough light to affect the brightness of the left zone, the right zone, or both. Example interfering objects may include lights from oncoming vehicles, street lights, traffic lights, reflective lane markings, or the like. Additionally, different types of road surfaces may reflect different levels of light toward the vision sensor 105.

The processing device 120 may be programmed to identify interfering objects in the image. Interfering objects that affect the left and right zones in substantially the same way may be ignored by the processing device 120. If an interfering object is identified that has a greater effect on the left zone or the right zone, the processing device 120 may be programmed to compensate for the light added to the image by the interfering object. For instance, the processing device 120 may be programmed to filter the additional light caused by the interfering object. Filtering the light may include ignoring the pixels in the left zone, the right zone, or both, associated with the light caused by the interfering object. Another way to compensate for the additional light caused by the interfering object may include defining the left zone and the right zone to exclude as many interfering objects as possible while still capturing enough of the area that should be illuminated by the left and right headlights 115, respectively. Some interfering objects, such as a street lamp, may only be captured by the vision sensor 105 briefly. In such instances, the processing device 120 may be programmed to only evaluate whether one of the headlights 115 has malfunctioned when no interfering objects are present.

The processing device 120 may be programmed to evaluate whether the headlights 115 are functioning properly during operation of the host vehicle 100, and specifically, while the headlights 115 are turned on. The processing device 120 need not continually evaluate the headlights 115, however. For instance, the processing device 120 may be programmed to evaluate the headlights 115 at period intervals such as, e.g., every 5 minutes, every 10 minutes, every 15 minutes, etc.

FIG. 3 is an example image 300 that may be processed to determine whether one of the headlights 115 has malfunctioned. The image 300 includes three zones—a first zone 130A, a second zone 130B, and a third zone 130C. The first zone 130A may include an area that should be primarily illuminated by the left headlight. The second zone 130B may include an area that should be primarily illuminated by the right headlight. The third zone 130C may include an area that is not expected to be illuminated by either headlight. Alternatively, the third zone 130C may include an area where the light from the left and right headlights 115 overlaps sufficiently that it is difficult to distinguish the origin of the light. Further, the third zone 130C may further include areas with significant interfering light from, e.g., oncoming traffic, street lamps, or other interfering objects 135. The processing device 120 may determine the brightness of the pixels in the first zone 130A and the second zone 130B. The brightness may include a summation of brightness values or an average brightness value associated with each of those zones 130. The processing device 120 may further determine a brightness difference between the first zone 130A and the second zone 130B. The brightness difference may be compared to a predetermined threshold. If the brightness difference exceeds the predetermined threshold, the processing device 120 may output an alert indicating that one of the headlights 115 may have malfunctioned. The alert may further identify which headlight has malfunctioned.

Moreover, to reduce the likelihood that the processing device 120 will incorrectly identify a malfunctioning headlight, the processing device 120 may compensate for interfering objects 135 found in one or more zones 130. In the example image 300 of FIG. 3, the first zone 130A includes two interfering objects 135—a reflective lane marker 135A and a lamp post 135B. While the light generated by the lamp post 135B may be strongest in the third zone 130C, some light from the lamp post 135B may shine onto the first zone 130A, the second zone 130B, or both. Therefore, upon detecting the presence of the lamp post 135B, the processing device 120 may compensate for any light generated by the lamp post 135B that may shine onto the first zone 130A or second zone 130B. Further, if the lane marker 135A in the first zone 130A is reflective, the processing device 120 may compensate for the additional light that may be reflected onto the vision sensor 105.

Figure 4:
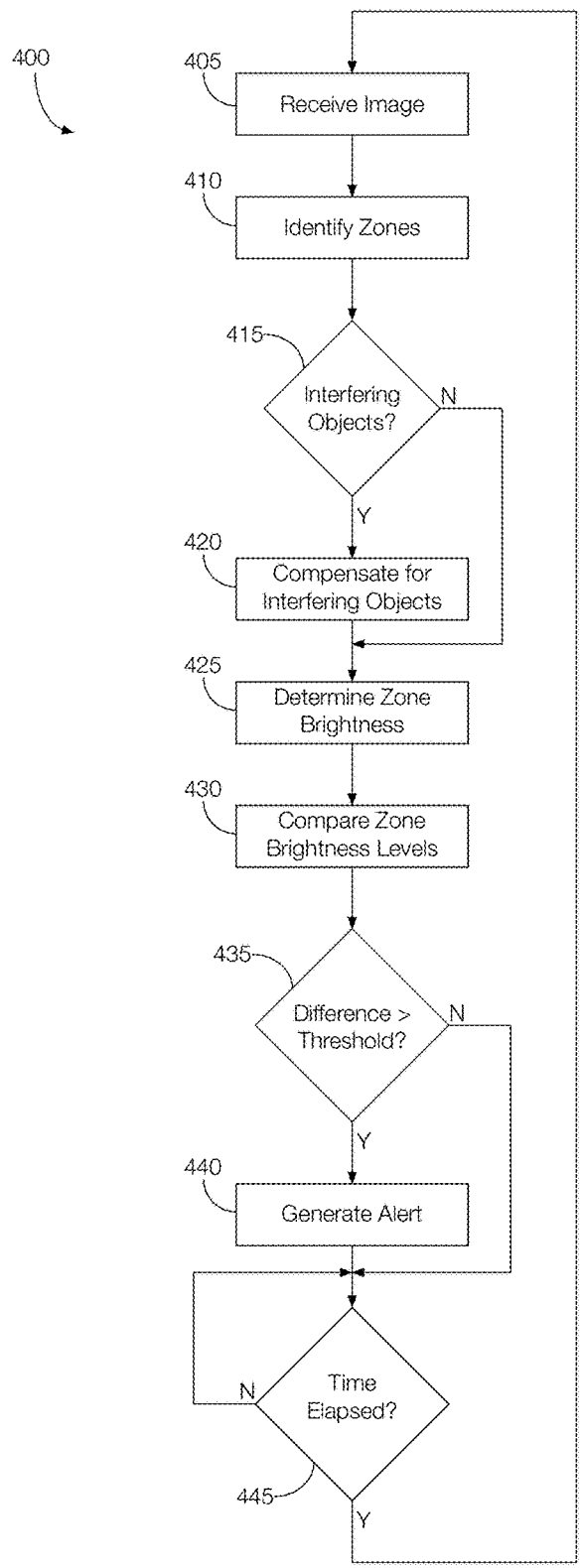
FIG. 4 is a flowchart of an example process that may be executed by the system to determine whether a headlight has malfunctioned and to notify the driver accordingly.

FIG. 4 is a flowchart of an example process 400 that may be executed by the headlight assessment system 110 to determine whether a headlight has malfunctioned and to notify the driver of the host vehicle 100 accordingly.

At block 405, the headlight assessment system 110 may receive an image of an area ahead of the host vehicle 100. The image may be captured by the vision sensor 105, and a signal representing the image may be transmitted to the processing device 120 for processing.

At block 410, the headlight assessment system 110 may identify different zones 130 in the image. For example, as shown in FIG. 3, the first zone 130A may include an area expected to be primarily illuminated by the left headlight and the second zone 130B may include an area expected to be primarily illuminated by the right headlight. The third zone 130C, if identified, may include an area significantly illuminated by both the left and right headlights 115. Each zone 130 may include multiple pixels, and each pixel may be associated with a brightness value. The number of pixels in each zone 130 may be different. That is, the first zone 130A and the second zone 130B may have roughly the same number of pixels. The third zone 130C, however, may have a different number of pixels (likely more pixels) that the first zone 130A and the second zone 130B. In processing the image, the processing device 120 may identify the different zones 130.

At block 415, the headlight assessment system 110 may determine whether any interfering objects 135 appear in the image. The interfering object 135 may include any object that contributes or reflects enough light to affect the brightness of the left zone 130A, the right zone 130B, or both. Example interfering objects 135 may include lights from oncoming vehicles, street lights, traffic lights, reflective lane markings, or the like. Additionally, different types of road surfaces may reflect different levels of light toward the vision sensor 105, and thus, the road itself may act as an interfering object 135. If an interfering object 135 is present, the process 400 may proceed to block 420. If no interfering objects 135 are present, the process 400 may proceed to block 425.

At block 420, the headlight assessment system 110 may compensate for the light generated by the interfering object 135. Compensating for the interfering object 135 may include ignoring the interfering object 135, filtering the light caused by the interfering object 135, redefining the zones 130 to exclude as many interfering objects 135 as possible, or waiting until no interfering objects 135 are in the first zone 130A and the second zone 130B. For example, the processing device 120 may ignore interfering objects 135 that affect the left and right zones 130 in substantially the same way. If an interfering object 135 is identified that has a greater effect on the left zone 130A or the right zone 130B, the processing device 120 may filter the additional light caused by the interfering object 135. Filtering the light may include ignoring the pixels in the left zone 130A, the right zone 130B, or both, associated with the light caused by the interfering object 135. Alternatively or in addition, the processing device 120 may redefine the left zone 130A and the right zone 130B to exclude as many interfering objects 135 as possible while still capturing enough of the area that should be illuminated by the left and right headlights 115, respectively. For instances where the interfering object 135 is only briefly in the view of the vision sensor 105, the processing device 120 may wait to continue to process the image until the interfering object 135 is no longer in the image. In this case, the process 400 may further include continually receiving and processing new images until no interfering objects 135 are detected in the first zone 130A and the second zone 130B. After compensating for the interfering objects 135, the process 400 may proceed to block 425.

At block 425, the headlight assessment system 110 may determine the brightness associated with each zone 130 associated with one of the headlights 115. For instance, the processing device 120 may determine the brightness associated with the first zone 130A (the first brightness) and the brightness associated with the second zone 130B (the second brightness). Determining the brightness may include summing the brightness values of each pixel in the first zone 130A and in the second zone 130B. For instance, the processing device 120 may determine the first brightness based on the sum of the brightness values of the pixels in the first zone 130A. Likewise, the processing device 120 may determine the second brightness based on the sum of the brightness values of the pixels in the second zone 130B. In some instances, the processing device 120 may evaluate an average pixel brightness. Therefore, the processing device 120 may further determine the average pixel brightness of the first zone 130A and the second zone 130B. The processing device 120 may determine the average pixel brightness of the first zone 130A by, e.g., dividing the first brightness by the number of pixels in the first zone 130A. The processing device 120 may determine the average pixel brightness of the second zone 130B by, e.g., dividing the second brightness by the number of pixels in the second zone 130B.

At block 430, the headlight assessment system 110 may compare the first brightness to the second brightness. The processing device 120 may compare the first brightness to the second brightness, or alternatively, compare the average pixel brightness in the first zone 130A to the average pixel brightness in the second zone 130B. The comparison performed by the processing device 120 at block 430 may result in a brightness difference.

At block 435, the headlight assessment system 110 may determine whether the brightness difference exceeds a predetermined threshold. For instance, the processing device 120 may compare the brightness difference determined at block 430 to the predetermined threshold. If the brightness difference exceeds the predetermined threshold, the process 400 may proceed to block 440. If the brightness difference does not exceed the predetermined threshold, the process 400 may proceed to block 445.

At block 440, the headlight assessment system 110 may generate a signal indicating that one of the headlights 115 has malfunctioned. In some instances, the processing device 120 may generate and output the signal. Further, the signal output by the processing device 120 may identify which headlight has malfunctioned based on, e.g., the magnitude of the brightness difference. For instance, if the pixels in the left zone 130A are significantly darker than the pixels in the right zone 130B, the signal may indicate that the left headlight has malfunctioned. If, however, the pixels in the right zone 130B are significantly darker than the pixels in the left zone 130A, the signal may indicate that the right headlight has malfunctioned. The processing device 120 may output the signal to the display device 125 or instrument panel so that an appropriate warning or indicator may be illuminated to alert the driver of the malfunctioning headlight. The process 400 may end after block 440 or, in some instances, may proceed to block 445.

At decision block 445, the headlight assessment system 110 may wait a predetermined amount of time before reevaluating the headlights 115. For example, the processing device 120 may wait for a predetermined interval of time to elapse before the process 400 proceeds to block 405. Example intervals may include, e.g., 5 minutes, 10 minutes, 15 minutes, etc.

The process 400 may end after block 440 is executed or when the host vehicle 100 is turned off, whichever occurs first. If block 440 leads to block 445, however, the process 400 may end after the host vehicle 100 is turned off.

With the process 400, the headlight assessment system 110 may notify the driver when a headlight is believed to have malfunctioned. The headlight assessment system 110 compares the brightness levels of two parts of the image captured by the image sensor. Since two fully functioning headlights 115 will output approximately the same amount of light, the difference between the brightness levels should be relatively minimal if both headlights 115 are working properly. If one of the headlights 115 has malfunctioned, however, the headlight assessment system 110 may notify the driver so that the driver can confirm the headlight malfunction via visual inspection of the headlights 115.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a processing device programmed to identify a first zone and a second zone in an image of an area ahead of a vehicle, compare a first brightness associated with the first zone to a second brightness associated with the second zone to determine a brightness difference, and determine whether at least one vehicle headlight has malfunctioned based at least in part on the brightness difference.

2. The vehicle system of claim 1, wherein the first zone and the second zone each include a plurality of pixels, and wherein each pixel is associated with a brightness value.

3. The vehicle system of claim 2, wherein the first brightness includes a sum of the brightness values of each pixel in the first zone and the second brightness includes a sum of the brightness values of each pixel in the second zone.

4. The vehicle system of claim 3, wherein the first brightness and the second brightness each include an average pixel brightness.

5. The vehicle system of claim 4, wherein the average pixel brightness associated with the first brightness includes the sum of the brightness values of each pixel in the first zone divided by a number of total pixels in the first zone.

6. The vehicle system of claim 4, wherein the average pixel brightness associated with the second brightness includes the sum of the brightness values of each pixel in the second zone divided by a number of total pixels in the second zone.

7. The vehicle system of claim 1, wherein the processing device is programmed to compare the brightness difference to a predetermined threshold.

8. The vehicle system of claim 7, wherein the processing device is programmed to determine whether the at least one vehicle headlight has malfunctioned based at least in part on whether the brightness difference exceeds the predetermined threshold.

9. The vehicle system of claim 1, further comprising a vision sensor programmed to capture the image of the area ahead of the vehicle.

10. The vehicle system of claim 1, further comprising a display device programmed to display the image in a passenger compartment of the vehicle.

11. The vehicle system of claim 1, wherein the processing device is programmed to identify at least one interfering object in the image.

12. The vehicle system of claim 11, wherein the processing device is programmed to compensate for light generated by the interfering object prior to determining whether the at least one vehicle headlight has malfunctioned.

13. The vehicle system of claim 11, wherein the processing device is programmed to determine the first brightness and the second brightness when no interfering objects are detected.

14. A method comprising:
receiving an image of an area ahead of a vehicle;
identifying a first zone and a second zone in the image;
comparing a first brightness associated with the first zone to a second brightness associated with the second zone to determine a brightness difference; and
determining whether at least one vehicle headlight has malfunctioned based at least in part on the brightness difference.

15. The method of claim 14, wherein the first zone and the second zone each include a plurality of pixels, and wherein each pixel is associated with a brightness value.

16. The method of claim 15, further comprising determining the first brightness and the second brightness.

17. The method of claim 16, wherein determining the first brightness and the second brightness includes:
summing the brightness values of each pixel in the first zone to determine the first brightness; and
summing the brightness values of each pixel in the second zone to determine the second brightness.

18. The method of claim 16, wherein determining the first brightness and the second brightness includes determining an average pixel brightness of the pixels in the first zone and of the pixels in the second zone.

19. The method of claim 14, further comprising comparing the brightness difference to a predetermined threshold, and wherein determining whether the at least one vehicle headlight has malfunctioned is based at least in part on whether the brightness difference exceeds the predetermined threshold.

20. The method of claim 14, further comprising:
determining whether at least one interfering object appears in the image; and
one of:
compensating for light generated by the interfering object prior to determining whether the at least one vehicle headlight has malfunctioned if at least one interfering object is detected, and
determining the first brightness and the second brightness when no interfering objects are detected.

* * * * *